United States Patent
Zaffino et al.

(10) Patent No.: US 10,625,454 B2
(45) Date of Patent: *Apr. 21, 2020

(54) TOOL WITH CONFORMAL COOLING

(71) Applicant: Ariel Andre Waitzman, Franklin, MI (US)

(72) Inventors: Pascal Zaffino, Windsor (CA); David Liolli, Windsor (CA)

(73) Assignee: Ariel Andre Waitzman, Franklin, MI (US)

( * ) Notice: Subject to any disclaimer, the term of this patent is extended or adjusted under 35 U.S.C. 154(b) by 327 days.

This patent is subject to a terminal disclaimer.

(21) Appl. No.: 15/687,815

(22) Filed: Aug. 28, 2017

(65) Prior Publication Data

US 2017/0355121 A1 Dec. 14, 2017

Related U.S. Application Data

(63) Continuation-in-part of application No. 14/934,534, filed on Nov. 6, 2015, now abandoned, which is a
(Continued)

(51) Int. Cl.
| | |
|---|---|
| B29C 45/73 | (2006.01) |
| B23K 9/04 | (2006.01) |
| B23K 33/00 | (2006.01) |
| B23K 10/02 | (2006.01) |
| B22D 17/22 | (2006.01) |
| B23K 26/342 | (2014.01) |
| B22C 9/00 | (2006.01) |
| B29C 33/04 | (2006.01) |

(Continued)

(52) U.S. Cl.
CPC ............ *B29C 45/7312* (2013.01); *B22C 9/00* (2013.01); *B22D 17/2218* (2013.01); *B23K 9/04* (2013.01); *B23K 10/027* (2013.01); *B23K 26/342* (2015.10); *B23K 33/004* (2013.01); *B29C 33/04* (2013.01); *B29C 33/3835* (2013.01); *B29C 33/3842* (2013.01); *B29K 2101/00* (2013.01); *B29K 2905/00* (2013.01); *B29L 2031/3044* (2013.01); *Y10T 29/49* (2015.01)

(58) Field of Classification Search
None
See application file for complete search history.

(56) References Cited

U.S. PATENT DOCUMENTS

| | | |
|---|---|---|
| 3,613,207 A | 10/1971 | Malburg |
| 4,234,119 A | 11/1980 | Masaoka et al. |
| (Continued) | | |

FOREIGN PATENT DOCUMENTS

| | | |
|---|---|---|
| DE | 19623148 C2 | 4/1998 |
| JP | 360152371 | 8/1985 |

*Primary Examiner* — Monica A Huson
(74) *Attorney, Agent, or Firm* — Carlson, Gaskey & Olds, P.C.

(57) ABSTRACT

A method of providing a tool with a conformal cooling passage includes rough machining a cavity generally corresponding to a manufactured part shape using CAD data. Conformal cooling slots are cut in the cavity using the CAD data. The conformal cooling slots are welded shut using the CAD data to provide conformal cooling passages. A class A surface is machined over the conformal cooling passage and corresponds to a finished manufactured part shape using the CAD data.

20 Claims, 4 Drawing Sheets

Related U.S. Application Data continuation of application No. 14/736,387, filed on Jun. 11, 2015, now Pat. No. 9,327,437, which is a continuation of application No. 13/958,002, filed on Aug. 2, 2013, now Pat. No. 9,095,892, which is a continuation of application No. 12/870,017, filed on Aug. 27, 2010, now Pat. No. 8,517,248.

(60) Provisional application No. 61/251,498, filed on Oct. 14, 2009.

(51) Int. Cl.
*B29C 33/38* (2006.01)
*B29K 101/00* (2006.01)
*B29L 31/30* (2006.01)

(56) References Cited

U.S. PATENT DOCUMENTS

| | | |
|---|---|---|
| 4,621,185 A | 11/1986 | Brown |
| 6,112,804 A | 9/2000 | Sachs et al. |
| 6,802,705 B2 | 10/2004 | Brand et al. |
| 7,549,459 B2 | 6/2009 | Sun |
| 8,517,248 B2 | 8/2013 | Zaffino |
| 9,095,892 B2 * | 8/2015 | Zaffino ............... B22D 17/2218 |
| 9,327,437 B2 * | 5/2016 | Zaffino ............... B22D 17/2218 |
| 2002/0153130 A1 | 10/2002 | Okamoto et al. |
| 2003/0022008 A1 | 1/2003 | Jogan et al. |
| 2005/0072386 A1 | 4/2005 | Gabriel et al. |
| 2006/0099295 A1 | 5/2006 | Elliott |
| 2006/0099298 A1 | 5/2006 | Hayes et al. |
| 2011/0024393 A1 | 2/2011 | Cui et al. |
| 2011/0083823 A1 | 4/2011 | Zaffino |
| 2011/0256257 A1 | 10/2011 | Hughes |

\* cited by examiner

US 10,625,454 B2

TOOL WITH CONFORMAL COOLING

RELATED APPLICATIONS

This application is a continuation-in-part of prior U.S. patent application Ser. No. 14/934,534 filed Nov. 6, 2015. The '534 Application is a continuation of prior U.S. patent application Ser. No. 14/736,387, filed Jun. 11, 2015. The '387 Application is a continuation of prior U.S. patent application Ser. No. 13/958,002, filed on Aug. 2, 2013. The '002 Application is a continuation of prior U.S. patent application Ser. No. 12/870,017, filed on Aug. 27, 2010, which claims the benefit of U.S. Provisional Application No. 61/251,498, filed on Oct. 14, 2009.

BACKGROUND

This disclosure relates to tools having conformal cooling and a method for providing the same.

Moulds, such as those used in plastic injection moulding, are subject to significant heat during the injection moulding process. The moulds are cooled during injection moulding to cool the plastic part and improve cycle times.

Similarly, forming dies are subject to significant heat during metal forming processes. The dies are cooled during forming processes to cool the metal part and improve cycle times.

Over the years conformal cooling has been used to improve cooling by providing more uniform cooling of a part in a tool. A conformal cooling approach provides cooling passages that generally conform to or follow the contour of the manufactured part beneath the finished surface of a tool. Since the finished surface is of a generally complex shape, it is difficult to provide conformal cooling passages in the desired location. Typically, intersecting passages are gun-drilled into the tool, and then plugged at various locations, to provide the conformal cooling passages. Providing conformal cooling passages in this manner is undesirable due to the large expense, the difficulty in gun-drilling large tools (such as those used for vehicle bumpers), and the poor approximation of the conformal cooling passages to the finished mould surface.

SUMMARY

This disclosure relates to a tool, such as a mould or die, with a cut conformal cooling slot having a surface. Weld beads laid on the surface enclose the cut conformal cooling slot with a metal filler adjoining the cut conformal cooling slot to provide an enclosed conformal cooling passage. A class A machined surface is provided across the weld beads adjoining the cut conformal cooling slot.

A method of providing a tool with a conformal cooling passage includes rough machining a tool cavity generally corresponding to a part shape using CAD data. Conformal cooling slots are cut in the tool cavity using the CAD data. The conformal cooling slots are welded shut using the CM) data to provide conformal cooling passages. A class A surface is machined over the conformal cooling passage and corresponds to a finished part shape using the CAD data.

BRIEF DESCRIPTION OF TILE DRAWINGS

DETAILED DESCRIPTION

Figure 1A:
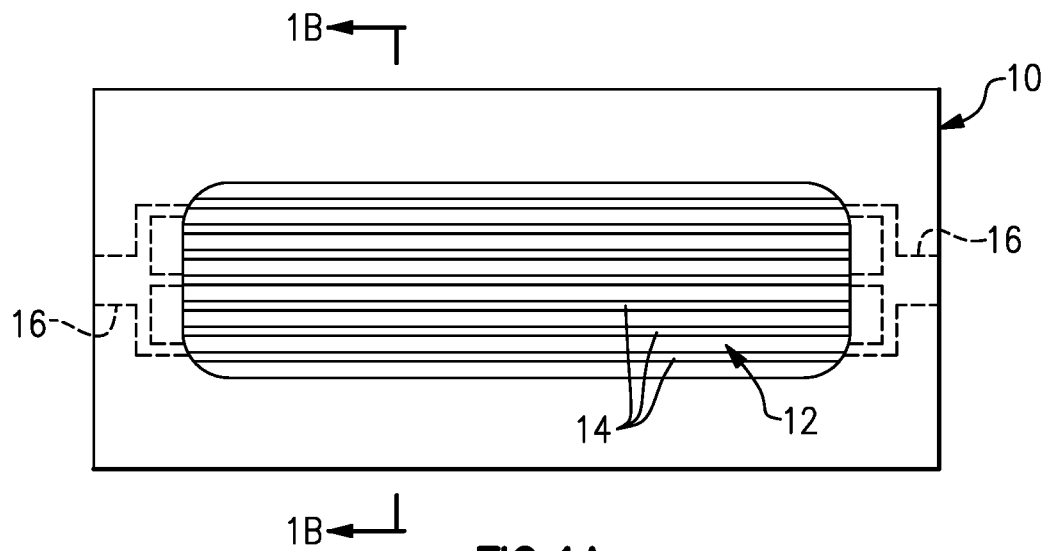
FIG. 1A is a top elevational view of mould with a rough mould cavity and cut conformal cooling slots.
Figure 1B:
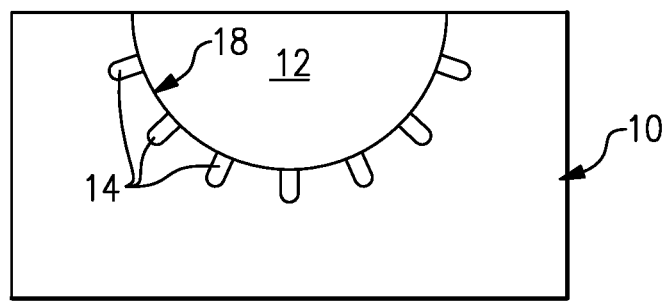
FIG. 1B is a cross-sectional view of the mould in FIG. 1A taken along line 1A-1A.

A mould 10 is shown in FIGS. 1A and 1B that is suitable, for example, for injection moulding. The mould 10 was provided as a blank and machined to provide a rough mould cavity 12 having a rough contoured surface 18 generally corresponding to a shape of a part to be moulded, for example, a vehicle bumper. Cut conformal cooling slots 14 are machined into the rough contoured surface 18 at a first depth 25 of 1.5-2.5 inches, for example. Other fluid passages 16 may be machined to intersect the cut conformal cooling slots 14 to communicate fluid from a cooling fluid source.

Figure 2:
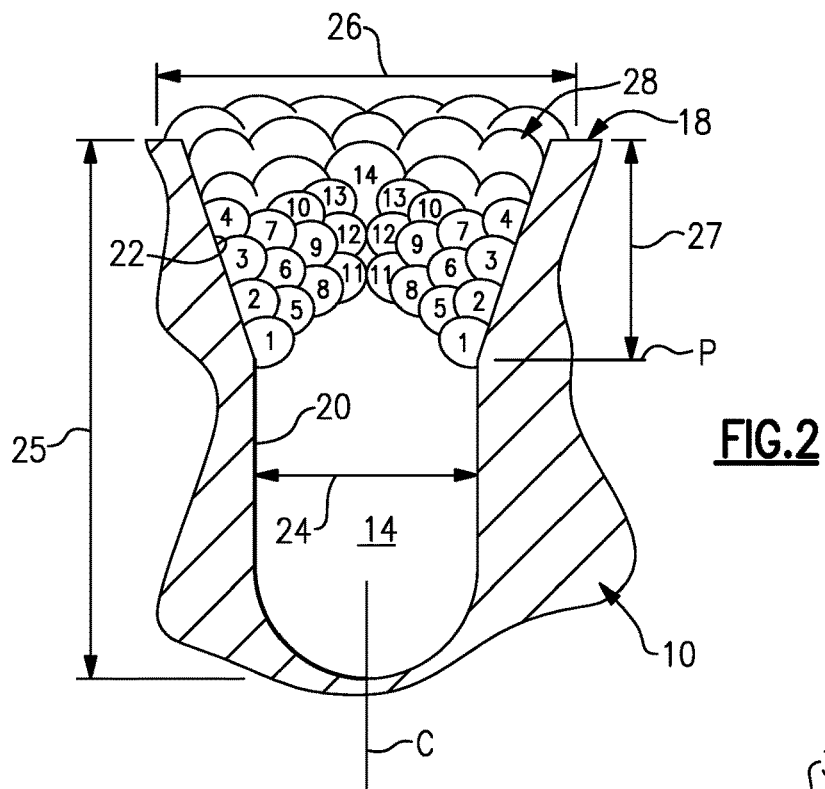
FIG. 2 is a cross-sectional view of a cut conformal cooling slot with weld beads.

An example cut conformal cooling slots 14 is shown in more detail in FIG. 2. The cut conformal slot 14 provides spaced apart lateral walls 20, providing a first width 24, that are generally parallel with one another in the example shown. Spaced apart angled walls 22 adjoin the lateral walls 20 and taper generally away from one another to provide a second width 26 where the angled walls 22 meet the rough contoured surface 18. In one example, the first width 24 is approximately 0.5 inch, and the second width 26 is approximately 0.75 inch at the rough contoured surface 18. The lateral and angled walls 20, 22 may be provided by a single cutting tool.

The angled walls 22 are provided at an angle of approximately 10-20° relative to the lateral walls to provide a surface for welding. The cut conformal cooling slot 14 includes a centerline C, and the angled walls 22 are provided at an angle relative to the centerline C. During welding, the angled walls 22 are arranged at an obtuse angle relative to a true horizontal plane P to reduce the undesired effects of gravity on the weld bead as it transitions from the molten state to solid metal. Weld beads 28 are laid on the angle walls 22 starting at a second depth 27 of approximately 0.5-0.75 inch below the rough contoured surface 18. The weld beads 28 are built up on top of one another, for example, in the number sequence indicated in FIG. 2, until the weld beads are proud of the rough contoured surface. The weld beads 28 are robotically TIG welded onto the mould 10 according to U.S. application Ser. No. 11/924,649, filed Oct. 27, 2007, which is incorporated by reference.

Figure 3:
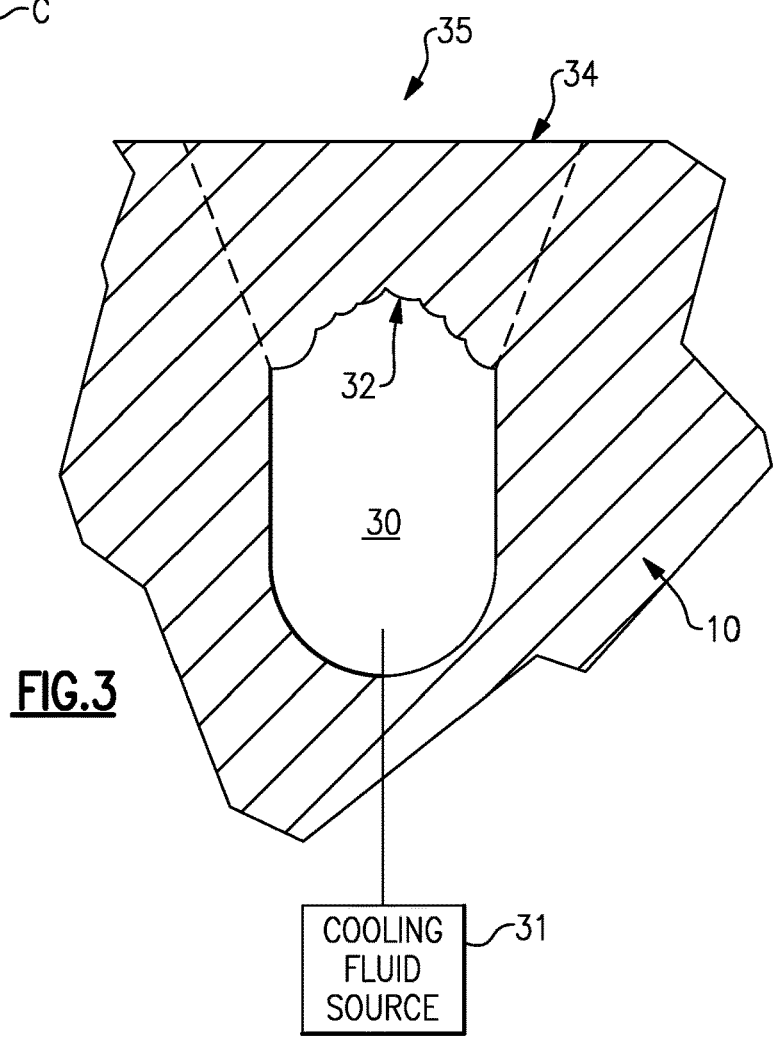
FIG. 3 is a cross-sectional view of an enclosed conformal cooling slot with an adjacent machined surface.

Referring to FIG. 3, the weld beads 28 provide a welded surface 32 of metal filler that, together with the cut conformal cooling slot 14, provides an enclosed conformal cooling passage 30. The finished conformal cooling passage 30 corresponds to a passage diameter of, for example, between ⅜ and ¾ inch. During use, the conformal cooling passages are fluidly connected to a cooling fluid source 31. Dashed lines indicate the previously present angled walls. The weld beads 28 and rough contoured surface 18 are machined to provide a class A machined surface 34 that corresponds to the finished moulded part shape.

Figure 4:
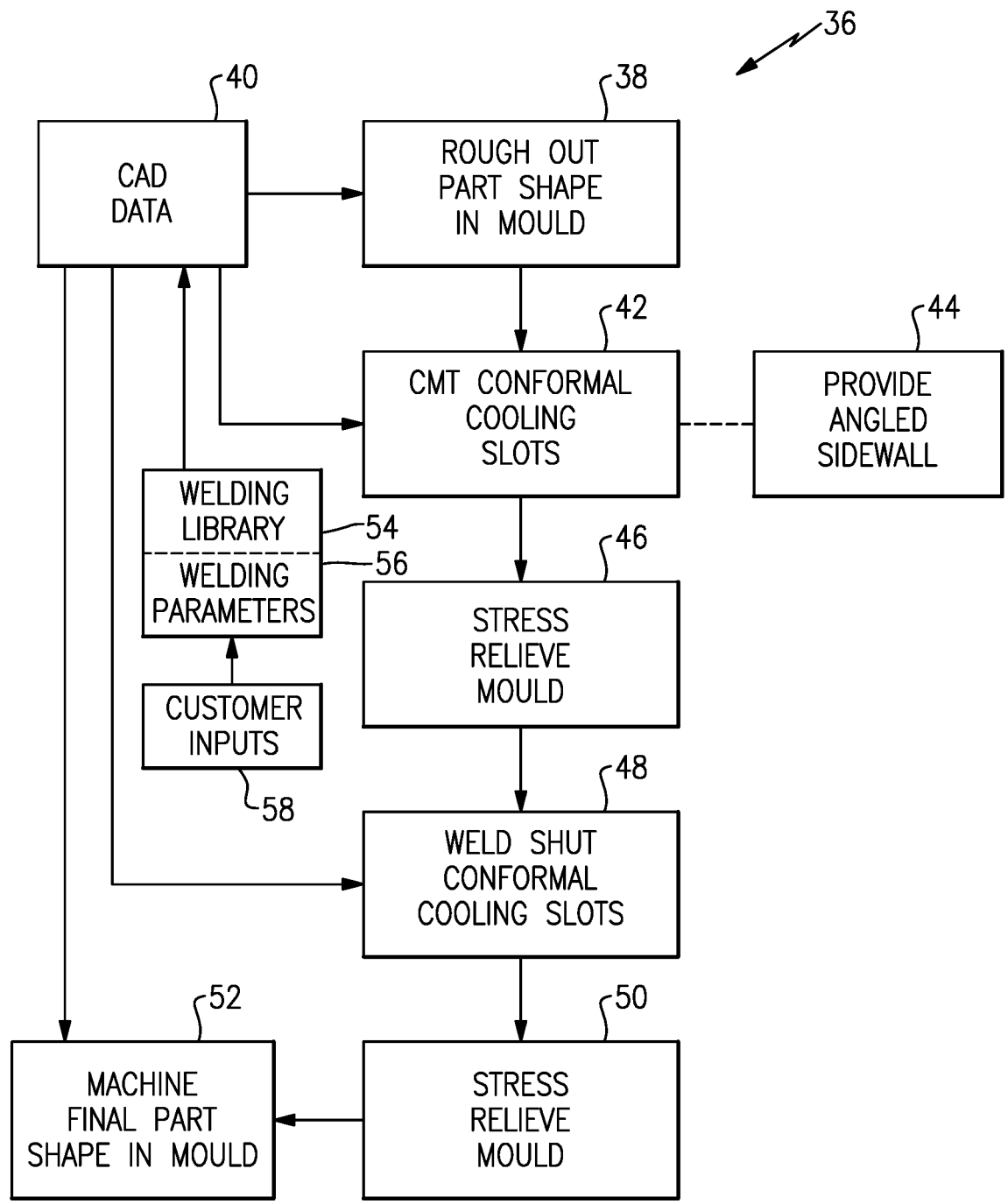
FIG. 4 is flowchart depicting a mould manufacturing method.

A mould manufacturing method 36 is schematically illustrated in FIG. 4. At least portions of the manufacturing method are provided by a controller (riot shown), which may include hardware and/or software and temporary and/or permanent memory, for example, CAD data, robotic control algorithms and other information. CAD data 40 is used to rough out the part shape in the mould 10 to provide the rough mould cavity 12, as indicated at block 38. The cut conformal cooling slots 14 are machined, as indicated at block 42, in desired locations using the CAD data 40. Angled walls 22 are provided in cut conformal cooling slots 44 providing the welding torch adequate access, as indicated in block 44. The mould 10 is heated to provide stress relief, as indicated at block 46.

As indicated at block 48, weld beads 28 are robotically TIG welded onto the angled walls 22 using the CAD data 40 to create enclosed conformal cooling passages 30. The controller includes a welding library 54 in one example, which includes various welding parameters 56. The welding parameters may include, for example, travel speed of the welding torch, feed rate of the wire and welding current. The welding parameters are organized into sets of welding preferences associated with a conformal cooling passage size. For example, a ⅜ inch diameter cooling passage may include welding preferences of approximately 0.5 lb./hour wire feed rate a relatively low amperage and low welding torch speed. By way of contrast, a conformal cooling passage of approximately ¾ inch diameteray include welding preferences of 1.5 lb./hour wire feed rate and higher amperages and welding tip travel speed than that of a ⅜ inch conformal cooling passage. Thus, the welding step includes selecting from the predetermined set of welding preferences based upon the conformal cooling passage size. The available access for the welding torch may also affect the welding preferences.

The welding preferences are intended to accommodate all tool steels. The customer is permitted to provide a customer input 58 to vary some of the welding preferences by a predetermined amount. For example, customers may be permitted to vary the weld torch travel speed, wire feed rate and amperage by up to 10% to accommodate the customer's preferences and variations between different tool steels, for example.

The mould 10 is stress relieved after welding, as indicated at block 50. The weld beads 28 and rough contoured surface 18 are machined using CAD data 40 to provide a class A machined surface 34 corresponding to a finished part shape, as indicated in block 52.

Figure 5:
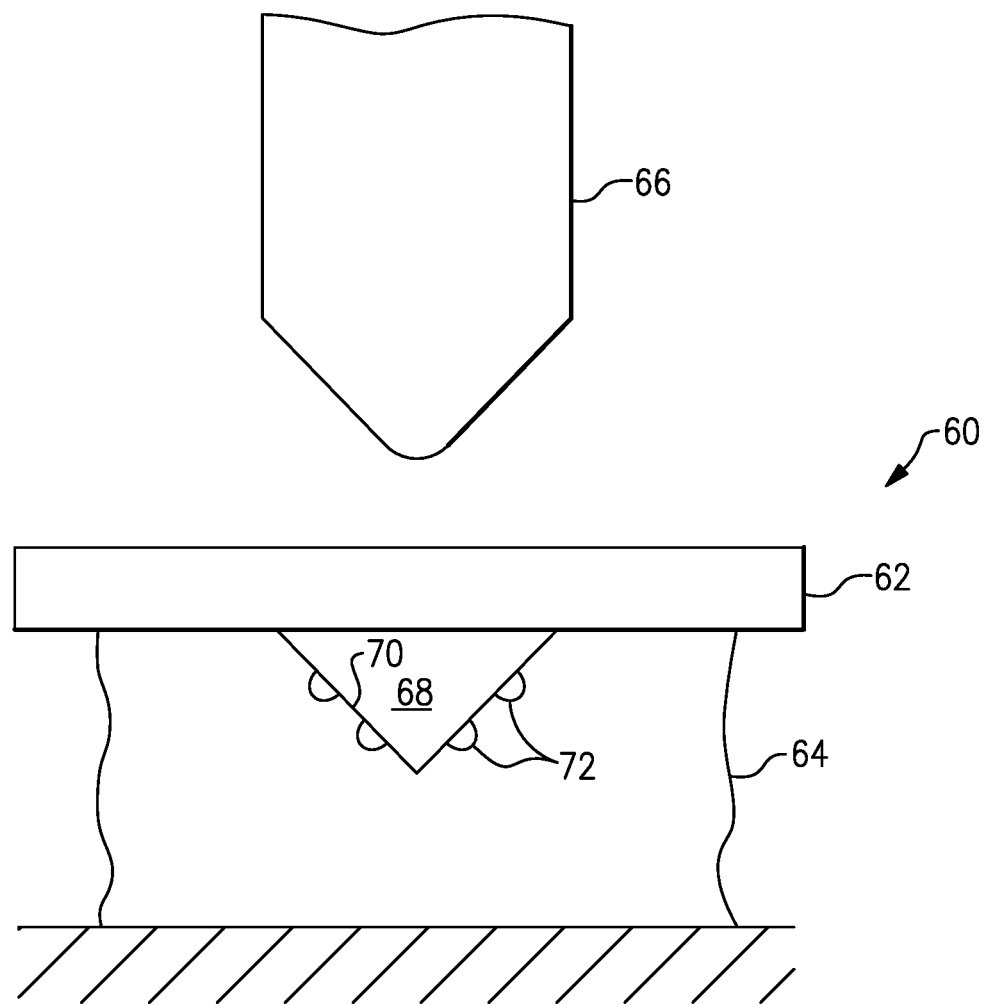
FIG. 5 is a cross-sectional view of a forming die with a rough cavity and cut conformal cooling slots.

FIG. 5 illustrates a die forming assembly 60 for machining a part 62, such as a sheet metal part. The die forming assembly 60 includes a forming die 64 and a punch 66. The forming die 64 was machined to provide a rough forming cavity 68 having a rough contoured surface 70 generally corresponding to a shape of a part to be formed. Cut conformal cooling slots 72 are machined into the rough contoured surface 70 and enclosed by weld beads, as described relative to FIGS. 2 and 3. In this respect, the above disclosure relating to the shaping, formation, and use of conformal cooling slots relative to moulds is applicable to the die forming assembly 60.

The punch 66 may also be machined to correspond to a shape of a part to be formed. The above embodiment describes conformal cooling slots 72 located on the forming die 64 of die forming assembly 60. However, conformal cooling slots 22 may also be provided on the punch 66 alone or in combination with conformal slots provided on the die 64.

Although an example embodiment has been disclosed, a worker of ordinary skill in this art would recognize that certain modifications would come within the scope of the claims. For example, although a vehicle bumper has been disclosed as an example manufactured part, moulds and dies for other large parts can benefit from the disclosed tool and method. Additionally, although a mould and a forming die have been disclosed, other tools may benefit from the disclosed tool and method. For that reason, the following claims should be studied to determine their true scope and content.

The invention claimed is:

1. A method of providing a tool with a conformal. cooling passage comprising:
   cutting conformal cooling slots into a cavity of the tool;
   shutting the conformal cooling slots to provide conformal cooling passages;
   laying weld beads in the conformal cooling slots until the weld beads are proud of an adjacent surface of the tool; and
   machining a surface over the conformal cooling passage corresponding to a finished machined part shape.

2. The method according to claim 1, wherein the tool is a forming die.

3. The method according to claim 1, wherein the tool is a mould.

4. The method according to claim 1, wherein the step of shutting the conformal cooling slots includes welding shut the conformal cooling slots with a first number of weld beads that span the conformal cooling slots.

5. The method according to claim 4, wherein the step of laying weld beads in the conformal cooling slots includes laying additional weld beads on the first number of weld beads.

6. The method according to claim 1, wherein the cut conformal cooling slot includes first and second widths, the second width greater than the first width, and wherein the conformal cooling slots are shut adjacent the intersection of the first and second widths.

7. The method according to claim 6, wherein each of the cut conformal cooling slots includes a first depth and a second depth less than the first depth, the second depth including the second width.

8. The method according to claim 6, wherein the cut conformal cooling slots each include an angled surface providing the second width, the angled surfaces being angled relative to a centerline of a respective one of the cut conformal cooling slots.

9. The method according to claim 8, wherein each angled surface is arranged at an obtuse angle relative to a true horizontal plane.

10. The method according to claim 1, further comprising heating the tool after cutting the conformal cooling slots to relieve stress from the tool.

11. A part-producing die forming assembly, comprising:
    a forming die and a punch;
    at least one conformal cooling passage located subjacent to a forming surface to be cooled, said at least one conformal cooling passage formed from:
       a series of interconnected open channels placed in a forming surface of said die forming assembly, said channels substantially conforming to the contour of said forming surface, the open channels being sealed at a distance from a bottom of each channel so as to form an enclosed cooling passage at the bottom thereof, and
       a plurality of weld beads that substantially fill a volume of each channel above said distance, said weld beads shaped to conform to said forming surface of said die forming assembly surrounding that channel;
    an inlet associated with said at least one conformal cooling passage for receiving pressurized cooling fluid from a source thereof; and an outlet associated with said at least one conformal cooling passage for expelling cooling fluid to a heat removal device after said cooling fluid has passed through said at least one conformal cooling passage.

12. The die forming assembly of claim 11, wherein said channels are sealed by a bridging weld located within each channel, said bridging welds comprising a series of connected weld beads, said bridging welds spanning each channel.

13. The die forming assembly of claim 11, wherein said conformal cooling slots are located on said forming die.

14. The die forming assembly of claim 13, wherein said conformal cooling slots are also located on said punch.

15. The die forming assembly of claim 11, wherein said inlet and outlet of said at east one conformal cooling passage are accessible from an exterior of said die forming assembly.

16. A method of producing a part, comprising:
    providing a die forming assembly, said part-producing die forming assembly comprising:
        at least one conformal cooling passage located subjacent to a forming surface to be cooled, said at least one conformal cooling passage formed from:
            a series of interconnected open channels placed in a forming surface of said die forming assembly, said channels substantially conforming to the contour of said forming surface, the open channels being sealed at a distance from a bottom of each channel so as to form an enclosed cooling passage at the bottom thereof, and
            a plurality of weld beads that substantially fill a volume of each channel above said distance, said weld beads shaped to conform to said forming surface of said die forming assembly surrounding that channel;
        an inlet associated with said at least one conformal cooling passage for receiving pressurized cooling fluid from a source thereof; and
        an outlet associated with said at least one conformal cooling passage for expelling cooling fluid to a heat removal device after said cooling fluid has passed through said at least one conformal cooling passage; and
    forming a part using said die forming assembly.

17. The method of claim 16, wherein said channels are sealed by a bridging weld located within each channel, said bridging welds comprising a series of connected weld beads, said bridging welds spanning each channel.

18. The method of claim 16, wherein said forming step includes die forming a sheet metal part.

19. The method of claim 16, further comprising establishing a flow of pressurized cooling fluid and directing said flow of pressurized cooling fluid to said inlet.

20. The method of claim 16, wherein said flow of pressurized cooling fluid is directed to said inlet during said step of forming said part.

\* \* \* \* \*